United States Patent [19]
Patterson, Jr.

[11] Patent Number: 5,230,486
[45] Date of Patent: Jul. 27, 1993

[54] UNDERWING COMPRESSION VORTEX ATTENUATION DEVICE

[75] Inventor: James C. Patterson, Jr., Newport News, Va.

[73] Assignee: The United States of America as represented by the Administrator of the National Aeronautics and Space Administration, Washington, D.C.

[21] Appl. No.: 886,998

[22] Filed: May 22, 1992

[51] Int. Cl.⁵ .............................................. B64C 23/06
[52] U.S. Cl. ...................................... 244/199; 244/198
[58] Field of Search ................. 244/198, 197, 200, 130

[56] References Cited

U.S. PATENT DOCUMENTS 3,984,070 10/1976 Patterson, Jr. .
3,997,132 12/1976 Erwin .
4,377,267 3/1983 Haworth ............................ 244/199
4,955,958 9/1990 Dellinger et al. .
5,037,044 8/1991 Seyfang ................................ 244/199

FOREIGN PATENT DOCUMENTS 0470287 5/1969 Switzerland ........................ 244/199

OTHER PUBLICATIONS

James Scheiman et al. "Exploratory Investigation of Factors Affecting the Wing Tip Vortex" Apr. 1972.

Primary Examiner—David M. Mitchell
Assistant Examiner—Christopher P. Ellis
Attorney, Agent, or Firm—Kimberly A. Chasteen

[57] ABSTRACT

A vortex attenuation device is presented which dissipates a lift-induced vortex generated by a lifting aircraft wing. The device consists of a compression panel attached to the lower surface of the wing and facing perpendicular to the airflow across the wing. The panel is located between the midpoint of the local wing cord and the trailing edge in the chord-wise direction and at a point which is approximately 55% of the wing span as measured form the fuselage center line in the spanwise direction. When deployed in flight, this panel produces a positive pressure gradient aligned with the final roll-up of the total vortex system which interrupts the axial flow in the vortex core and causes the vortex to collapse.

4 Claims, 1 Drawing Sheet

UNDERWING COMPRESSION VORTEX ATTENUATION DEVICE

ORIGIN OF THE INVENTION

The invention described herein was made by employees of the United States Government and may be used by and for the Government for governmental purposes without the payment of any royalties thereon or therefor.

BACKGROUND OF THE INVENTION

The present invention relates generally to aircraft aerodynamics and specifically to a method and apparatus for attenuating the lift-induced vortex generated by the wings of an aircraft.

The lift-induced vortex system associated with large jet aircraft has become a major problem to the air traffic controller as an unseen hazard to smaller following aircraft. The problem arises from the fact that the vortex system created by large aircraft is very strong and of such long persistence and that it intensifies as the weight of the aircraft increases. The rotational airflow or vortex developed at or near the wingtip of an aircraft remains essentially stationary in space and induces a rolling moment on smaller following aircraft is encountered. This rolling moment can be so strong that it surpasses the limits of control of the smaller aircraft and such loss of control has been proven to occur as far as 4 miles behind a large aircraft. The vortex problem is particularly severe in flight paths around major airports where smaller aircraft are most likely to follow large aircraft and during landing where the small aircraft has little altitude in which to regain control.

The vortex system also causes the induced drag of the aircraft which, for transport-type aircraft, is 35 to 40% of the total drag of the aircraft. Aircraft wings are designed to shed the vortex system along the span of the wing to reduce the concentrated vortex centered just behind each wingtip. The final roll-up of the vortex system is further behind the wing thereby reducing, but not eliminating, its ill effect on the drag of the aircraft.

Previous attempts to limit the vortex effect have generally been unsuccessful either because, as with wing end plates or wingtip extensions, the devices did not sufficiently modify the far downstream effects of the vortex or, as with landing flap variations and wing spoilers, the vortex attenuation caused too great a lift loss for the aircraft. These devices are only concerned with attenuating wingtip vortices, not with attenuating the entire vortex system.

It is an object of the present invention to attenuate the total vortex system produced by an aircraft.

It is another object of this invention to provide an apparatus which is effective on all types of aircraft.

It is a further object of this invention to provide an apparatus which causes an increase in wing lift rather than a reduction when deployed.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing an apparatus for dissipating a lift-induced vortex generated by a lifting aircraft wing having a leading edge, a trailing edge, an upper surface and a lower surface. The wing includes a positive pressure gradient producing means in the form of a compression panel attached to the lower surface of the wing and facing perpendicular to the airflow across the wing. The panel is located between the midpoint of the local wing cord and the trailing edge in the chord-wise direction and at a point which is approximately 55% of the wing span as measured from the fuselage center line in the spanwise direction. The panel is hinged so that is may be retracted when its use is unnecessary. This apparatus does not provide elevational control; its purpose is to dissipate the total vortex system of an aircraft.

DETAILED DESCRIPTION OF THE INVENTION

Figure 1:
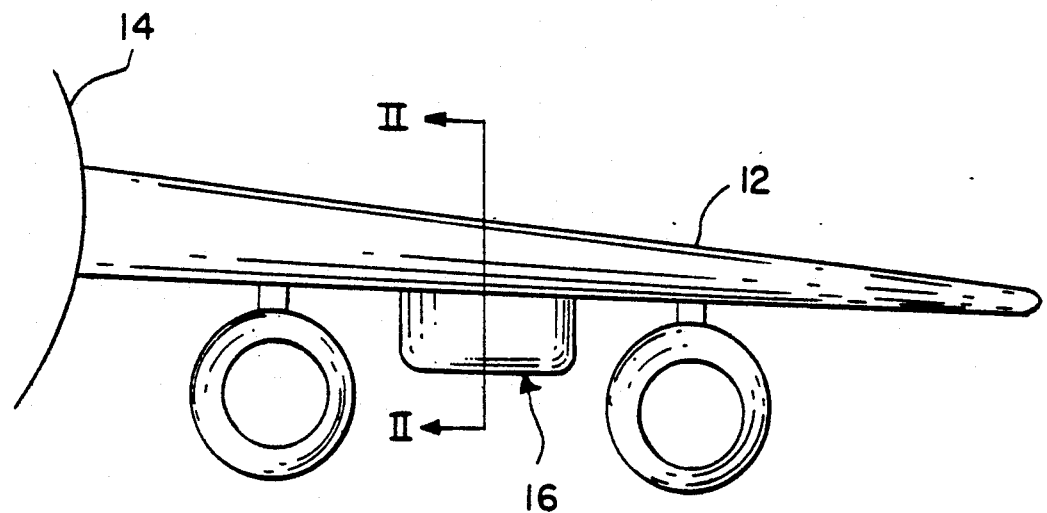
FIG. 1 is a front view of an aircraft wing.
Figure 2:
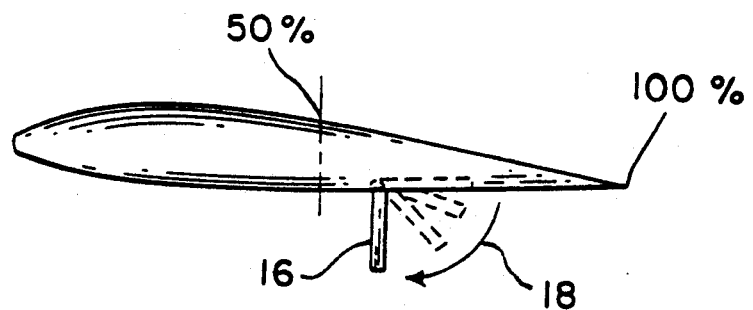
FIG. 2 is a cross sectional view taken along line II—II FIG. 1.

FIGS. 1 and 2 show an aircraft wing 12 extending from a fuselage 14. A compression panel 16 extends from the lower surface of the wing 12. The preferred location of the panel 16 is between the midpoint and trailing edge of the wing 12 in the wing chord direction and at a point which is approximately 55% of the wingspan as measured for the fuselage center line. The surface area of panel 16 is approximately one half of one percent of the total wing surface area. The ideal shape for the panel 16 is rectangular with the width being two to three times the height. The size, shape and position of the panel 16 may vary depending on the aircraft and the flap system used on that aircraft. The panel 16 should be constructed and located such that is produces a positive pressure gradient aligned with the final roll-up of the total vortex system which interrupts the axial flow in the vortex core and causes the vortex to collapse. The panel 16 is hinged so that it may be removed from the airstream when not in use. The panel 16 will be lowered into a position (see arrow 18) which is perpendicular to the airflow when the aircraft is likely to encounter other aircraft which would be disturbed by its vortices, such as in takeoff and landing.

The placement of the panel 16 is critical to ensure that the entire vortex system is dissipated. At the position indicated above, the panel 16 will attenuate the wingtip vortex and the smaller vortices created along the entire wingspan.

What is claimed is:

1. An apparatus for dissipating a lift-induced vortex system generated by an aircraft wing in an airflow having a leading edge, a trailing edge, an upper surface and a lower surface comprising: a positive pressure gradient producing means; said gradient producing means being a panel which is attached to the lower surface of the wing and which faces in a direction perpendicular to the airflow, wherein said panel is located such that it produces a positive pressure gradient aligned with the final roll-up of the total vortex system which interrupts the axial flow in the vortex core and causes the vortex to collapse, said location being approximately 55 percent of the wing span as measured from the fuselage center line and between the midpoint of the local wing chord and the trailing edge, whereby the vortex system is eliminated.

2. The apparatus of claim 1 in which the panel is hingedly attached to the lower surface of the wing.

3. An apparatus for dissipating a lift-induced vortex generated by an aircraft wing in an airflow comprising an aircraft having an elevator control device, a fuselage wing having a leading edge, a trailing edge, an upper surface, a lower surface and a positive pressure gradient producing means; said gradient producing means being a panel which is attached to the lower surface of the wing and which faces in a direction perpendicular to the airflow, wherein said panel is located such that it produces a positive pressure gradient aligned with the final roll-up of the total vortex system which interrupts the axial flow in the vortex core and causes the vortex to collapse, said location being approximately 55 percent of the wing span as measured from the fuselage center line and between the midpoint of the local wing chord and the trailing edge, whereby the vortex system is eliminated.

4. The apparatus of claim 3 in which the panel is hingedly attached to the lower surface of the wing.

* * * * *